(12) United States Patent
Hayakawa et al.

(10) Patent No.: US 10,115,500 B2
(45) Date of Patent: *Oct. 30, 2018

(54) COMPOSITE CABLE AND COMPOSITE HARNESS

(71) Applicant: Hitachi Metals, Ltd., Tokyo (JP)

(72) Inventors: Yoshikazu Hayakawa, Hitachi (JP); Tomoyuki Murayama, Hitachi (JP); Hirotaka Eshima, Hitachi (JP); Fumihito Oka, Hitachi (JP); Takahiro Futatsumori, Mito (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,370

(22) Filed: Jan. 18, 2018

(65) Prior Publication Data

US 2018/0144845 A1 May 24, 2018

Related U.S. Application Data

(63) Continuation of application No. 15/447,819, filed on Mar. 2, 2017, now Pat. No. 9,881,716.

(30) Foreign Application Priority Data

Mar. 9, 2016 (JP) .................................. 2016-045447

(51) Int. Cl.
*H01B 7/00* (2006.01)
*H01B 11/04* (2006.01)
(Continued)

(52) U.S. Cl.
CPC .......... *H01B 11/04* (2013.01); *B60R 16/0215* (2013.01); *B60T 13/741* (2013.01); *H01B 3/002* (2013.01); *B60T 2270/10* (2013.01)

(58) Field of Classification Search
CPC . H01B 7/02; H01B 7/04; H01B 3/002; H01B 9/02; H01B 9/003; H01B 9/04;
(Continued)

(56) References Cited

U.S. PATENT DOCUMENTS 3,324,233 A * 6/1967 Bryant ..................... H01B 7/06
174/113 R
7,304,241 B2 * 12/2007 Trieb ..................... H01R 9/032
174/74 R (Continued)

FOREIGN PATENT DOCUMENTS

JP         2014-135153 A      7/2014

*Primary Examiner* — William H Mayo, III
(74) *Attorney, Agent, or Firm* — Roberts Mlotkowski Safran Cole & Calderon, P.C.

(57) ABSTRACT

A composite cable includes a first twisted-pair wire formed by twisting a pair of first electric wires, a second twisted-pair wire formed by twisting a pair of second electric wires, a pair of third electric wires arranged between the first and second twisted-pair wires in a circumferential direction, each third electric wire having a larger outer diameter than the first and second electric wires, and a tape member spirally wound around an assembled article that is formed by twisting the first twisted-pair wire, the second twisted-pair wire and the pair of third electric wires together. The two twisted-pair wires have the same twist direction, the twist direction of the two twisted-pair wires is different from a twist direction of the assembled article, and the twist direction of the assembled article is different from a winding direction of the tape member.

11 Claims, 3 Drawing Sheets

(51) Int. Cl.
  *B60T 13/74* (2006.01)
  *B60R 16/02* (2006.01)
  *H01B 3/00* (2006.01)

(58) Field of Classification Search
  CPC ......... H01B 11/02; H01B 11/04; H01B 11/20;
    H01B 11/1891; G02B 6/4434; G02B
    6/46; B60R 16/0207
  USPC ..... 174/74 R, 74 A, 110 R, 113 R, 108, 109,
    174/120 R, 113 C, 36
  See application file for complete search history.

(56) References Cited

U.S. PATENT DOCUMENTS

| | | | |
|---|---|---|---|
| 7,918,685 B1 * | 4/2011 | Kruckenberg | H01B 11/00 |
| | | | 174/75 C |
| 8,546,690 B2 * | 10/2013 | Masakazu | H01B 11/002 |
| | | | 174/103 |
| 9,221,407 B2 | 12/2015 | Hayakawa | |
| 9,221,704 B2 * | 12/2015 | D'Agostini | F23D 14/66 |
| 9,244,240 B2 * | 1/2016 | Hayashishita | G02B 6/4434 |
| 9,443,646 B2 * | 9/2016 | Armbrecht | H01B 11/20 |
| 9,508,467 B2 * | 11/2016 | Pon | H01B 9/003 |
| 9,607,738 B1 * | 3/2017 | Wu | H01B 11/20 |
| 2003/0121694 A1 * | 7/2003 | Grogl | H01B 3/441 |
| | | | 174/113 R |
| 2005/0061536 A1 * | 3/2005 | Proulx | G06Q 10/08 |
| | | | 174/102 R |
| 2010/0051218 A1 * | 3/2010 | Allen | D21F 5/182 |
| | | | 162/116 |
| 2010/0051318 A1 | 3/2010 | Wang | |
| 2010/0084157 A1 * | 4/2010 | Wang | H01B 11/12 |
| | | | 174/107 |
| 2010/0258333 A1 * | 10/2010 | Horan | H01B 11/1091 |
| | | | 174/78 |
| 2011/0278043 A1 * | 11/2011 | Ueda | H01B 7/1895 |
| | | | 174/115 |
| 2012/0103646 A1 * | 5/2012 | Fox | H01B 9/028 |
| | | | 174/34 |
| 2014/0190741 A1 * | 7/2014 | Hayakawa | B60R 16/0207 |
| | | | 174/72 A |

\* cited by examiner

COMPOSITE CABLE AND COMPOSITE HARNESS

The present application is a Continuation Application under 35 USC § 120 of U.S. application Ser. No. 15/447,819, filed Mar. 2, 2017, which is based on Japanese patent application No.2016-045447 filed on Mar. 9, 2016. These prior applications are hereby incorporated in their entirety by reference.

BACKGROUND OF THE INVENTION

1. Field of the Invention

The invention relates to a composite cable and a composite harness and, in particular, to a composite cable and a composite harness which are used in a vehicle such as automobile for connection between a wheel side and a vehicle body side.

2. Description of the Related Art

In recent years, electrically operated brake units are used in vehicles such as automobiles.

Electro-mechanical brakes (EMB) and electric parking brakes (EPB) are known as such electrically operated brake units.

The electro-mechanical brakes, also simply called electric friction brake or electric brake, are configured such that a rotational drive force of a dedicated electric motor mounted on each wheel of a vehicle is controlled according to the operation amount (tread force or displacement amount) of a brake pedal by a driver, so that a piston driven by the electric motor presses brake pads against a disc rotor of the wheel to generate a braking force intended by the driver.

The electric parking brakes are configured such that a dedicated electric motor provided on each wheel of a vehicle is driven based on an operation performed on a parking brake activation switch by a driver after stopping a vehicle, so that a piston driven by the electric motor presses brake pads against a disc rotor of the wheel to generate a braking force.

Meanwhile, in recent years, sensors, e.g., ABS (Anti-Lock Brake System) sensor for detecting the speed of a wheel rotation during motion, air pressure sensor for detecting air pressure of a tire and temperature sensor, etc., are often mounted on wheels of vehicles.

Accordingly, the wheel side and the vehicle body side are connected through composite cables in which a signal line for a sensor mounted on a wheel and/or a signal line for controlling an electro-mechanical brake and a power line for supplying power to an electric motor of electro-mechanical brake or electric parking brake are housed in one sheath. The composite cables with connectors integrally provided at end portions are called composite harness.

JP-A-2014-135153 discloses a composite cable in which a lubricant such as talc powder is interposed between plural electric wires and a sheath covering all the plural electric wires together such that friction between the electric wires and the sheath is reduced to reduce stress applied to the electric wires when being bent and a flex resistance is thereby improved.

SUMMARY OF THE INVENTION

The composite cable disclosed by JP-A-2014-135153 has a problem that when terminating the cable, a lubricant such as talc powder may be scattered in a workplace so that the working environment deteriorates.

It is an object of the invention to provide a composite cable and a composite harness that prevent the deterioration of the working environment during the cable termination while securing the flex resistance.

According to an embodiment of the invention, a composite cable comprises:

a first twisted-pair wire formed by twisting a pair of first electric wires, each first electric wire comprising a first center conductor and a first insulation covering the first center conductor;

a second twisted-pair wire formed by twisting a pair of second electric wires, each second electric wire comprising a second center conductor and a second insulation covering the second center conductor;

a pair of third electric wires arranged between the first and second twisted-pair wires in a circumferential direction, each third electric wire having a larger outer diameter than the first and second electric wires and comprising a third center conductor with a larger cross-sectional area than the first and second center conductors and a third insulation covering the third center conductor; and a tape member spirally wound around an assembled article that is formed by twisting the first twisted-pair wire, the second twisted-pair wire and the pair of third electric wires together, wherein the two twisted-pair wires have the same twist direction, the twist direction of the two twisted-pair wires is different from a twist direction of the assembled article, and the twist direction of the assembled article is different from a winding direction of the tape member.

According to another embodiment of the invention, a composite harness comprises:

the composite cable mentioned above, and a connector attached to at least one of end portions of the first electric wires, of the second electric wires and of the third electric wires.

Effects of the Invention

According to an embodiment of the invention, a composite cable and a composite harness can be provided that prevent the deterioration of the working environment during the cable termination while securing the flex resistance.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment

An embodiment of the invention will be described below in conjunction with the appended drawings.

Description of Vehicle in Which Composite Cable is Used

Figure 1:
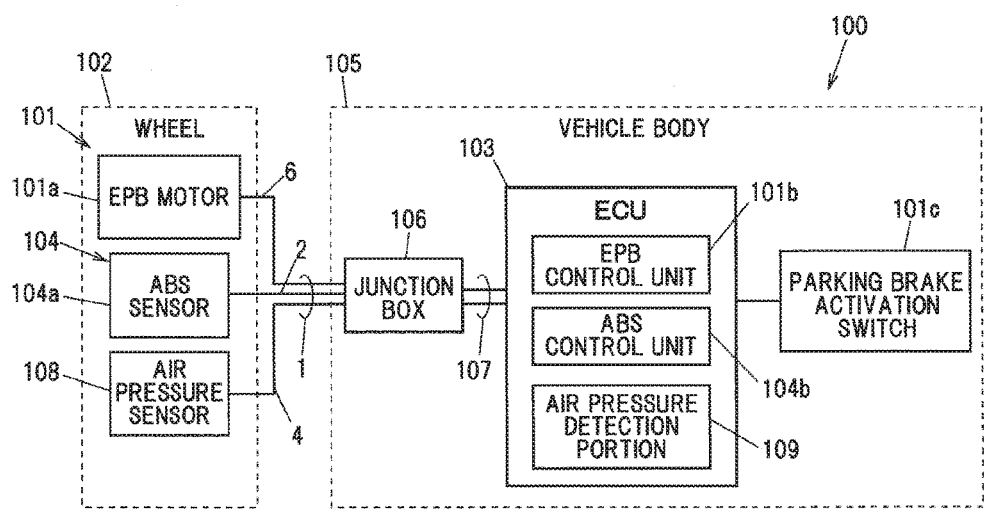
FIG. 1 is a block diagram illustrating a configuration of a vehicle in which a composite cable in an embodiment of the present invention is used.

FIG. 1 is a block diagram illustrating a configuration of a vehicle in which a composite cable in the present embodiment is used.

As shown in FIG. 1, a vehicle 100 is provided with an electric parking brake (hereinafter, referred to as "EPB") 101 as an electrically operated brake unit.

The EPB 101 is provided with an EPB motor 101a and an EPB control unit 101b.

The EPB motor 101a is a wheel-side device mounted on a wheel 102 of the vehicle 100. The EPB control unit 101b is mounted on an ECU (electronic control unit) 103 which is a vehicle body-side device of the vehicle 100. Alternatively, the control unit 101b may be mounted on a control unit other than the ECU 103, or may be mounted on a dedicated hardware unit.

The EPB motor 101a is provided with a piston to which brake pads are attached even though it is not illustrated, and it is configured such that the piston moved by rotary drive of the EPB motor 101a presses the brake pads against a disc rotor of a wheel (the wheel 102) to generate a braking force. A pair of third electric wires 6 as power lines are connected to the EPB motor 101a to supply a drive current to the EPB motor 101a.

The EPB control unit 101b is configured to output a drive current to the EPB motor 101a for a predetermined period of time (e.g., for 1 second) when a parking brake activation switch 101c is turned from an OFF state to an ON state during the stationary state of the vehicle 100 such that the brake pads are pressed against the disc rotor of the wheel 102 and a braking force to be applied to the wheel 102 is generated. The EPB control unit 101b is also configured to output a drive current to the EPB motor 101a when the parking brake activation switch 101c is turned from the ON state to the OFF state or when an accelerator pedal is depressed such that the brake pads move away from the disc rotor of the wheel and the braking force on the wheel 102 is released. In other words, it is configured such that an operating state of the EPB 101 is maintained from when the parking brake activation switch 101c is turned on to when the parking brake activation switch 101c is turned off or the accelerator pedal is depressed. The parking brake activation switch 101c may be a switch of either a lever-type or pedal-type.

An ABS device 104 is also mounted on the vehicle 100. The ABS device 104 is provided with an ABS sensor 104a and an ABS control unit 104b.

The ABS sensor 104a is a rotational speed sensor mounted on the wheel 102 to detect a rotation speed of the wheel 102 during motion of the vehicle. The ABS control unit 104b is mounted on the ECU 103 to control a brake unit based on an output of the ABS sensor 104a to adjust a braking force applied to the wheel 102 such that the wheel 102 is not locked when suddenly stopped. A pair of first electric wires 2 as signal lines is connected to the ABS sensor 104a.

An air pressure sensor 108 for sensing air pressure of a tire (not shown) of the wheel 102 is also provided on the wheel 102 of the vehicle 100. A pair of second electric wires 4 as signal lines is connected to the air pressure sensor 108.

An air pressure detection portion 109 for detecting air pressure of the tire based on an output of the air pressure sensor 108 is mounted on the ECU 103.

Figure 2A:
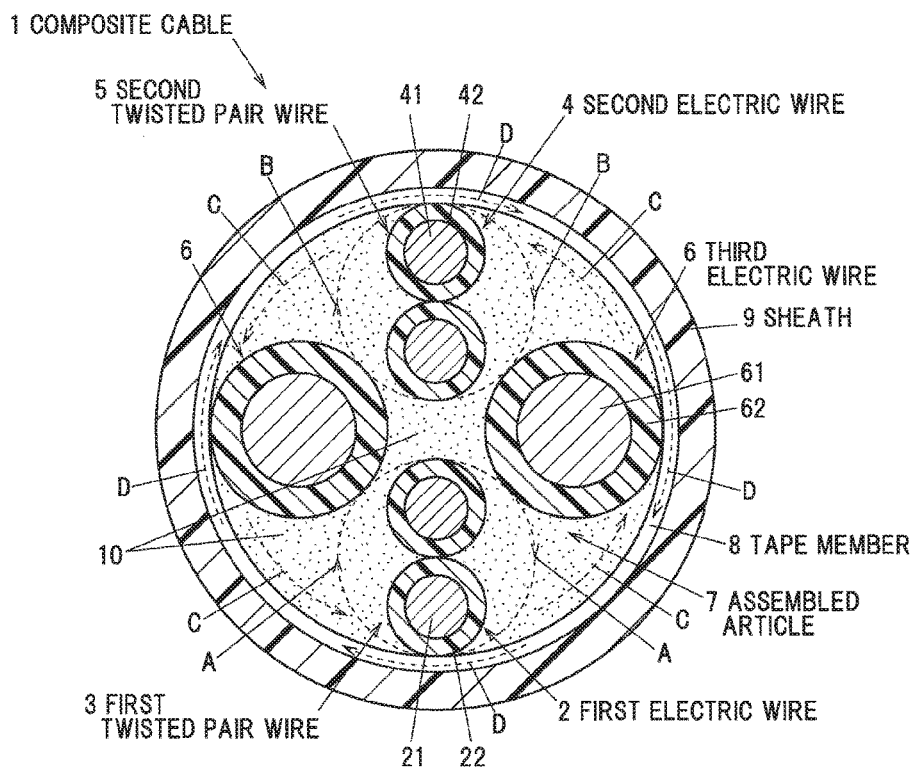
FIG. 2A is a cross sectional view showing the composite cable in the embodiment of the invention.
Figure 2B:
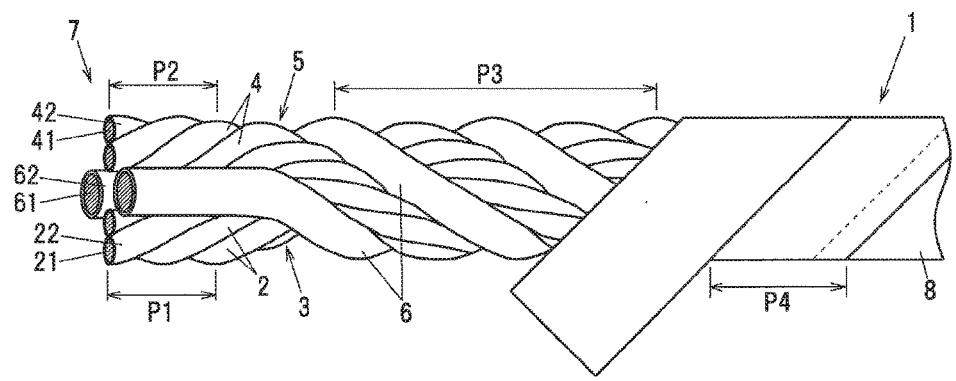
FIG. 2B is an explanatory diagram illustrating twist directions of two twisted-pair wires and third electric wires and a winding direction of a tape member in the composite cable.

A composite cable 1 in the present embodiment is obtained by covering the first electric wires 2, the second electric wires 4 and the third electric wire 6 with one sheath 9 (see FIGS. 2A and 2B). The composite cable 1 extending out of the wheel 102 side is connected to a wire group 107 inside a junction box 106 provided on a vehicle body 105 and is then connected to the ECU 103 and a battery (not shown) via the wire group 107.

Although only one wheel 102 is shown in FIG. 1 to simplify the drawing, the EPB motor 101a, the ABS sensor 104a and the air pressure sensor 108 may be mounted on each of the wheels 102 of the vehicle 100, or may be mounted on, e.g., only front wheels or only rear wheels of the vehicle 100.

Description of the Composite Cable 1

FIG. 2A is a cross sectional view showing the composite cable 1 in the present embodiment and FIG. 2B is an explanatory diagram illustrating twist directions of two twisted-pair wires and third electric wires and a winding direction of a tape member.

As shown in FIGS. 2A and 2B, the composite cable 1 is provided with a first twisted-pair wire 3 formed by twisting a pair of first electric wires 2 together, a second twisted-pair wire 5 formed by twisting a pair of second electric wires 4 together, a pair of third electric wires 6 having a larger outer diameter than the first electric wires 2 and the second electric wires 4, a tape member 8 spirally wound around an assembled article 7 which is formed by twisting the first twisted-pair wire 3, the second twisted-pair wire 5 and the pair of third electric wires 6 together, and a sheath 9 covering the tape member 8.

In the present embodiment, the first electric wire 2 is constructed using a signal line for the ABS sensor 104a mounted on the wheel 102. The first electric wire 2 has a first center conductor 21 and a first insulation 22 covering the first center conductor 21.

The first center conductor 21 is constructed from a stranded conductor formed by twisting highly conductive strands of copper, etc., and the first insulation 22 is formed of an insulating resin such as cross-linked polyethylene. Strands having a diameter of not less than 0.05 mm and not more than 0.30 mm can be used to form the first center conductor 21. When using strands having a diameter of less than 0.05 mm, sufficient mechanical strength may not be obtained, causing a decrease in flex resistance. When using strands having a diameter of more than 0.30 mm, flexibility of the composite cable 1 may decrease.

Meanwhile, the second electric wire 4 in the present embodiment is constructed using a signal line for the air pressure sensor 108 mounted on the wheel 102. The second electric wire 4 has a second center conductor 41 and a second insulation 42 covering the second center conductor 41. The second center conductor 41 is constructed from a stranded conductor formed by twisting highly conductive strands of copper, etc., and the second insulation 42 is formed of an insulating resin such as cross-linked polyethylene. Strands having a diameter of not less than 0.05 mm and not more than 0.30 mm can be used to form the second center conductor 41, in the same manner as the first center conductor 21.

In addition, the third electric wire 6 in the present embodiment is constructed using a power line for supplying a drive current to the motor 101a for the EPB 101 mounted on the wheel 102 of the vehicle 100. The third electric wire 6 has a third center conductor 61 and a third insulation 62 covering the third center conductor 61. The third center conductor 61 is constructed from a stranded conductor formed by twisting highly conductive strands of copper, etc., and the third insulation 62 is formed of an insulating resin such as cross-linked polyethylene. Strands having a diameter of not less than 0.05 mm and not more than 0.30 mm can be used to form the third center conductor 61, in the same manner as the first center conductor 21 and the second center conductor 41.

The cross sectional area (the conductor cross-sectional area) of the third center conductor 61 and the thickness of the third insulation 62 in the third electric wire 6 are appropriately adjusted according to magnitude of required drive current. In the present embodiment, since the first electric wire 2 and the second electric wire 4 are used as signal lines and the third electric wire 6 is used as a power line, the cross sectional area (the conductor cross-sectional area) of the third center conductor 61 is larger than that of the first center conductor 21 and the second center conductor 41. In the present embodiment, considering that the third electric wire 6 is a power line for supplying a drive current to the EPB motor 101a, the outer diameter of the third center conductor 61 is set to not less than 1.5 mm and not more than 3.0 mm and the outer diameter of the third electric wire 6 is set to not less than 2.0 mm and not more than 4.0 mm.

The outer diameter of the third electric wire 6 is larger than that of the first electric wire 2 and the second electric wire 4. In the present embodiment, the first twisted-pair wire 3 formed by twisting a pair (two) of first electric wires 2 and the second twisted-pair wire 5 formed by twisting a pair (two) of second electric wires 4 are twisted with the pair of third electric wires 6 to form the assembled article 7. Therefore, from the viewpoint of making the outer diameter of the composite cable 1 close to a circular shape, it is desirable to use the first electric wire 2 and the second electric wire 4 which are about half the outer diameter of the third electric wire 6.

In detail, it is possible to use the first electric wire 2 and the second electric wire 4 which have an outer diameter of not less than 1.0 mm and not more than 1.8 mm. The first electric wire 2 used in this example has the first center conductor 21 with a conductor cross-sectional area of not less than 0.13 cm$^2$ and not more than 0.30 cm$^2$, and the second electric wire 4 used in this example has the second center conductor 41 with a conductor cross-sectional area of not less than 0.30 cm$^2$ and not more than 0.50 cm$^2$. Although the conductor cross-sectional area is larger in the second electric wire 4 than in the first electric wire 2 in the present embodiment, the both electric wires 2 and 4 may have the same conductor cross-sectional area. From the viewpoint of making the cross sectional shape of the composite cable 1 closer to a circular shape, it is desirable that the outer diameters of the two electric wires 2 and 4 be substantially the same (e.g., a difference in outer diameter between the two electric wires 2 and 4 is within 20% of the outer diameter of the first electric wire 2).

A twist pitch P1 of the first twisted-pair wire 3 and a twist pitch P2 of the second twisted-pair wire 5 are set by taking into account the outer diameter of the first electric wire 2 and the second electric wire 4 such that an unnecessary load is not applied to the first electric wires 2 and the second electric wires 4. The twist pitches P1 and P2 of the two twisted-pair wires 3 and 5 here are about 30 mm, but the twist pitches P1 and P2 of the two twisted-pair wires 3 and 5 are not limited thereto. The twist pitches P1 and P2 of the two twisted-pair wires 3 and 5 may alternatively be different from each other.

The twist pitch P1 of the first twisted-pair wire 3 is a distance along a longitudinal direction of the first twisted-pair wire 3 between points at which a given first electric wire 2 is located at the same position in a circumferential direction of the first twisted-pair wire 3. Likewise, the twist pitch P2 of the second twisted-pair wire 5 is a distance along a longitudinal direction of the second twisted-pair wire 5 between points at which a given second electric wire 4 is located at the same position in a circumferential direction of the second twisted-pair wire 5.

The assembled article 7 is formed by twisting the first twisted-pair wire 3, the second twisted-pair wire 5 and the pair of third electric wires 6. In the present embodiment, each third electric wire 6 is arranged between the first twisted-pair wire 3 and the second twisted-pair wire 5 in a circumferential direction. In the cross section shown in FIG. 2A, the second twisted-pair wire 5, one of the third electric wires 6, the first twisted-pair wire 3 and the other third electric wire 6 are arranged clockwise in this order.

When the third electric wires 6 are arranged adjacent to each other in the circumferential direction (when the two twisted-pair wires 3 and 5 are arranged adjacent to each other), the center of gravity of the assembled article 7 largely shifts from the center position of the assembled article 7, and the assembled article 7 formed by twisting the two twisted-pair wires 3 and 5 and the third electric wires 6 in such a state is entirely distorted. In this case, it is difficult to manufacture a straight composite cable 1 and there is also a problem that the cable has some unbendable portions in a longitudinal direction, resulting in a decrease in flexibility. By arranging the third electric wires 6 between the first twisted-pair wire 3 and the second twisted-pair wire 5 in the circumferential direction as in the present embodiment, it is possible to easily realize the straight composite cable 1 and also to suppress a decrease in flexibility since a defect such as unbendable portions in the longitudinal direction is prevented from occurring.

Furthermore, in the present embodiment, the assembled article 7 is configured such that plural thread-shaped (fibrous) fillers 10 extending in the longitudinal direction of the composite cable 1 are arranged between the first twisted-pair wire 3/the second twisted-pair wire 5/the pair of third electric wires 6 and the tape member 8 and are twisted together with the two twisted-pair wires 3 and 5 and the third electric wires 6. Thus, the twist direction and twist pitch of the plural fillers 10 are the same as those of the assembled article 7. The plural fillers 10 are arranged to fill a gap between the two twisted-pair wires 3 and 5/the third electric wires 6 and the tape member 8, so that a cross sectional shape after winding the tape member 8 around the assembled article 7 is closer to a circle. In this regard, some of the plural fillers 10 may be arranged in triangle boundary areas between the two twisted-pair wires 3 and 5 and the third electric wires 6, triangle boundary areas between the pair of first electric wires 2 and triangle boundary areas between the pair of second electric wires 4.

As the filler 10, it is possible to use a fibrous material such as polypropylene yarn, spun rayon yarn (rayon staple fiber), aramid fiber, nylon fiber or fiber plastic, a paper or a cotton yarn. In addition, the cross sectional area of the fillers 10 on the cross section of FIG. 2A is preferably larger than the total cross-sectional area of the electric wires 2, 4 and 6 (the sum of the cross-sectional area of the first electric wires 2, the cross-sectional area of the second electric wires 4 and the cross-sectional area of the third electric wires 6).

In the EPB 101, a drive current is supplied for a short time when the parking brake activation switch 101c is operated and an effect of noise on the first electric wire 2 and the second electric wire 4 used as signal lines is small. Therefore, in the present embodiment, a shield conductor around the third electric wires 6 or the twisted-pair wires 3 and 5 is omitted. Omitting the shield conductor allows the composite cable 1 to have a smaller outer diameter than when providing the shield conductor and also reduces the number of components, thereby reducing the cost.

In addition, in the present embodiment, the first twisted-pair wire 3 transmitting an electrical signal during motion of the vehicle and the second twisted-pair wire 5 also transmitting an electrical signal during motion of the vehicle are separated by the pair of third electric wires 6 which supply a drive current to the EPB 101 mainly after the vehicle is stopped. This can reduce crosstalk between the first twisted-pair wire 3 and the second twisted-pair wire 5 even when shield conductors around the twisted-pair wires 3 and 5 are omitted.

Although the third electric wire 6 for supplying a drive current to the EPB motor 101a is described here, the third electric wire 6 may be used to supply a drive current to, e.g., an electric motor of an electro-mechanical brake (hereinafter, referred to as EMB) provided on the wheel 102. In this case, since a drive current often flows through the third electric wire 6, it is desirable to provide a shield conductor around the twisted-pair wires 3 and 5 (or around each of the electric wires 2 and 4) to reduce the effect of noise on the first electric wires 2 and the second electric wires 4 which are used as signal lines.

Meanwhile, although the first electric wire 2 as a signal line for the ABS sensor 104a and the second electric wire 4 as a signal line for the air pressure sensor 108 are described here, each of the first electric wire 2 and the second electric wire 4 may be a signal line used for another sensor provided on the wheel 102, e.g., for a temperature sensor, etc., or may be a damper wire used to control a damping device of the vehicle 100, or moreover, may be a signal line for controlling the EMB (a CAN cable, etc.).

The outer diameter of the entire assembled article 7 is, e.g., about 5 mm to 9 mm. A twist pitch P3 of the assembled article 7 is set by taking into account the outer diameter of the assembled article 7 such that an unnecessary load is not applied to the twisted-pair wires 3 and 5 and the third electric wires 6. The twist pitch P3 of the assembled article 7 here is about 60 mm, but the twist pitch P3 of the assembled article 7 is not limited thereto. The twist pitch P3 of the assembled article 7 is a distance along a longitudinal direction of the assembled article 7 between points at which a given the twisted-pair wire 3, 5 or third electric wire 6 is located at the same position in a circumferential direction of the assembled article 7.

The tape member 8 is spirally wound around the assembled article 7 so as to be in contact with all electric wires (the pair of first electric wires 2, the pair of second electric wires 4 and the pair of third electric wires 6) covered with the tape member 8. The tape member 8 is interposed between the assembled article 7 and the sheath 9 and serves to reduce friction between the assembled article 7 (the electric wires 2, 4 and 6) and the sheath 9 when being bent. In other words, providing the tape member 8 can reduce friction between the electric wires 2, 4, 6 and the sheath 9 without using a lubricant such as talc powder unlike the conventional technique, and thus reduces stress applied to the electric wires 2, 4 and 6 when being bent, and it is thereby possible to improve flex resistance.

The tape member 8 is desirably slidable (desirably has a low friction coefficient) with respect to the first insulation 22 of the first electric wire 2, the second insulation 42 of the second electric wire 4 and the third insulation 62 of the third electric wire 6, and can be formed of, e.g., a non-woven fabric, a paper or a resin (a resin film, etc.). In more detail, a material of the tape member 8 is selected such that the friction coefficient (coefficient of static friction) between the tape member 8 and the insulations 22, 42, 62 is lower than the friction coefficient (coefficient of static friction) between the sheath 9 and the insulations 22, 42, 62 without interposition of the tape member 8.

It is also possible to use the tape member 8 having a laminated structure composed of not less than two layers. In this case, the tape member 8 is configured such that a surface to be in contact with the assembled article 7 is formed of any one of a non-woven fabric, a paper or a resin layer. For example, it can be configured such that the tape member 8 is formed by providing a resin layer on one side of a paper and is wound with the resin layer having a lower friction coefficient on the assembled article 7 side.

The tape member 8 is spirally wound around the assembled article 7 so as to overlap at a portion in a width direction (a direction perpendicular to the longitudinal direction and thickness direction of the tape member 8). The overlap width of the tape member 8 is, e.g., not less than ¼ and not more than ½ of the width of the tape member 8. In the present embodiment, the overlapping portion of the tape member 8 is not adhered by an adhesive, etc.

The width of the tape member 8 is determined such that creases are not formed on the tape member 8 when the tape member 8 is wound, and it is desirable that the width of the tape member 8 to be used be decreased with a decrease in the outer diameter of the entire assembled article 7. In detail, when the outer diameter of the assembled article 7 is 5 mm to 9 mm, the width of the tape member 8 is about 20 mm to 50 mm. A winding pitch P4 of the tape member 8, i.e., a distance along a longitudinal direction between points on the tape member 8 at the same circumferential position (e.g., a distance between the widthwise edges), depends on the width of the tape member 8 and the overlap width (a winding angle of the tape member 8) and is up to about 40 mm in this case. The winding pitch P4 of the tape member 8 here is about 30 mm, but the winding pitch P4 of the tape member 8 is not limited thereto.

When the width of the tape member 8 is increased and the winding pitch P4 is also increased, the tape member 8 becomes close to the longitudinally wrapped state, resulting in that the composite cable 1 has less flexibility and is less likely to be bent. Therefore, the winding pitch P4 of the tape member 8 is desirably not more than 40 mm.

The sheath 9 is provided around the tape member 8. The sheath 9 is formed of, e.g., a urethane resin. Although a shield conductor around the tape member 8 is omitted in the present embodiment since the third electric wires 6 are used to supply a drive current to the EPB motor 101a and the drive current flows through the third electric wires 6 in a relatively short time, a shield conductor may be provided between the tape member 8 and the sheath 9 or around the sheath 9 depending on the intended use, etc., of the third electric wires 6.

Twist Directions of the Twisted-Pair Wires 3, 5 and the Assembled Article 7, and Winding Direction of the Tape Member 8

The composite cable 1 of the present embodiment is configured such that the two twisted-pair wires 3 and 5 have the same twist direction, the twist direction of the two twisted-pair wires 3 and 5 is different from the twist direction of the assembled article 7, and the twist direction of the assembled article 7 is different from the winding direction of the tape member 8. In other words, in the composite cable 1, the twist direction of the two twisted-pair wires 3 and 5 and the winding direction of the tape member 8 are the same direction and only the twist direction of the assembled article 7 is different.

The twist direction here is a direction that the electric wires 2, 4 and 6 rotate from the base end toward the front end when the composite cable 1 is viewed from the front end side (the left side of FIG. 2B, on the side where the tape member 8 overlaps upon itself). In this example, the twist direction of the twisted-pair wires 3 and 5 and the twist direction of the assembled article 7 are the right rotation (clockwise). The twist direction of the twisted-pair wires 3 and 5 is a direction of twisting two electric wires 2 or 4 and the twist direction of the assembled article 7 is a direction of twisting the twisted-pair wires 3 and 5 and the third electric wires 6.

Meanwhile, the winding direction of the tape member 8 is a direction that the tape member 8 rotates from the base end toward the front end when the composite cable 1 is viewed from the front end side (the left side of FIG. 2B, on the side where the tape member 8 overlaps upon itself). In this example, the winding direction of the tape member 8 is the right rotation (clockwise). The cross section as viewed from the front end side is shown in FIG. 2A in which the twist direction of the first twisted-pair wire 3 is indicated by a dashed arrow A, the twist direction of the second twisted-pair wire 5 is indicated by a dashed arrow B, the twist direction of the assembled article 7 is indicated by a dashed arrow C and the winding direction of the tape member 8 is indicated by a dashed arrow D.

In general, when twisting electric wires together or spirally winding a tape, a kink is formed according to the twist direction or the winding direction and the entire cable curves spontaneously. In the present embodiment, the twist direction of the twisted-pair wires 3 and 5 is different from the twist direction of the assembled article 7 and also the twist direction of the assembled article 7 is different from the winding direction of the tape member 8. Therefore, the kink of the twisted-pair wires 3 and 5 and the kink of the assembled article 7 are in the opposite directions and thus cancel out each other, and also, the kink of the assembled article 7 and the kink caused by winding the tape member 8 are in the opposite directions and thus cancel out each other, and it is thereby possible to easily realize a straight composite cable 1 which is prevented from kinking up. As a result, it is possible to reduce variation in bending properties in the longitudinal direction of the composite cable 1.

In case that the twist direction of the twisted-pair wires 3 and 5 is the same as the twist direction of the assembled article 7, the twisted-pair wires 3 and 5 may be distorted in a direction of tightening the twist when twisting the assembled article 7, causing a change in the twist pitches P1 and P2 of the twisted-pair wires 3 and 5. Differing the twist direction of the twisted-pair wires 3 and 5 from the twist direction of the assembled article 7 allows the assembled article 7 to be formed while suppressing a change in the twist pitches P1 and P2 of the twisted-pair wires 3 and 5.

In this regard, however, if the twist pitches P1 and P2 of the twisted-pair wires 3 and 5 are large, the twists of the twisted-pair wires 3 and 5 may loosen when twisting the assembled article 7. Therefore, the twist pitches P1 and P2 of the twisted-pair wires 3 and 5 are desirably smaller than at least the twist pitch P3 of the assembled article 7. In other words, when the twist direction of the twisted-pair wires 3 and 5 is different from the twist direction of the assembled article 7, adjusting the twist pitches P1 and P2 of the twisted-pair wires 3 and 5 to smaller than the twist pitch P3 of the assembled article 7 allows the twists of the twisted-pair wires 3 and 5 to be less likely to unravel and it is thereby possible to stabilize the cross sectional shape of the assembled article 7.

In the present embodiment, since the kink caused by winding the tape member 8 is used to straighten the kink of the assembled article 7, the winding pitch P4 of the tape member 8 needs to be small enough to cause a kink. Therefore, the winding pitch P4 of the tape member 8 is desirably smaller than at least the twist pitch P3 of the assembled article 7. In the present embodiment, the twist pitches P1 and P2 of the twisted-pair wires 3 and 5 are about 30 mm, the twist pitch P3 of the assembled article 7 is about 60 mm and the winding pitch P4 of the tape member 8 is about 30 mm.

The winding pitch P4 of the tape member 8 only needs to be not less than the twist pitches P1 and P2 of the twisted-pair wires 3 and 5. In such a configuration, it is possible to reduce distortion of the tape member 8 at a portion in contact with the twisted-pair wires 3 and 5 and it is easy to form the composite cable 1 having a circular cross sectional shape.

If the winding pitch P4 of the tape member 8 is smaller than the twist pitches P1 and P2 of the twisted-pair wires 3 and 5, the tape member 8 with the small winding pitch P4 stretches and contracts in the longitudinal direction when bending the composite cable 1 and is less likely to receive a load caused by the bending, and the load caused by the bending is concentrated on the twisted-pair wires 3 and 5 which have the large twist pitches P1 and P2 and are less likely to stretch and contract. When the winding pitch P4 of the tape member 8 is not less than the twist pitches P1 and P2 of the twisted-pair wires 3 and 5, it is possible to partially distribute the load caused by the bending to the tape member 8 such that the load caused by the bending is prevented from being concentrated on the twisted-pair wires 3 and 5, thereby improving flex resistance.

In addition, since the twist direction of the assembled article 7 is different from the winding direction of the tape member 8, the twist pitch P3 of the assembled article 7 is less likely to change when winding the tape member 8 and it is thereby possible to stabilize the twist pitch P3 of the assembled article 7.

Furthermore, by differing the twist direction of the assembled article 7 from the winding direction of the tape member 8, the tape member 8 is prevented from entering gaps between the twisted-pair wires 3, 5 and the third electric wires 6 and it is thereby possible to form the composite cable 1 having a cross sectional shape closer to a circle. This results in improving the outer appearance of the composite cable 1 and also allows the sheath 9 to be easily stripped and removed. Since the kink is reduced in the composite cable 1 as described above, the sheath 9 is stripped and removed more easily.

Furthermore, by differing the twist direction of the assembled article 7 from the winding direction of the tape member 8, a direction likely to cause buckling of the assembled article 7 can be different from a direction likely to cause buckling of the tape member 8. Therefore, it is possible to realize the composite cable 1 which is less likely to buckle even when, e.g., twist and bend are simultaneously applied to the composite cable 1.

Description of Composite Harness Using the Composite Cable 1

Figure 3:
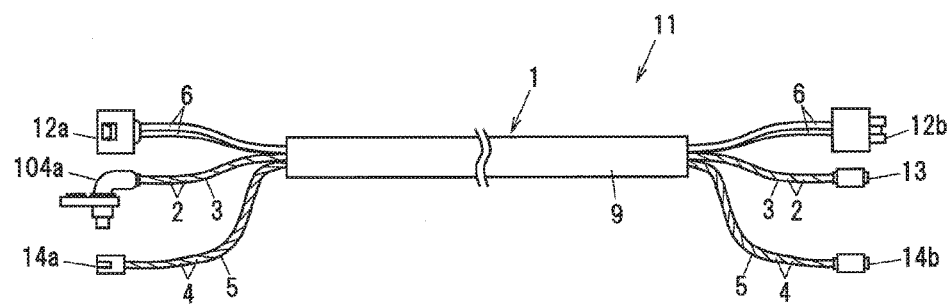
FIG. 3 is a schematic configuration diagram illustrating a composite harness in the embodiment of the invention.

FIG. 3 is a schematic configuration diagram illustrating a composite harness in the present embodiment.

As shown in FIG. 3, a composite harness 11 is composed of the composite cable 1 in the present embodiment and a connector attached to at least one of end portions of the first electric wires 2, of the second electric wires 4 and of the third electric wires 6.

In FIG. 3, an end portion on the wheel 102 side is shown on the left side and an end portion on the vehicle body 105 side (the junction box 106 side) is shown on the right side. In the following description, an end of the composite harness 11 on the wheel 102 side is referred to as "one end" and another end on the vehicle body 105 side (the junction box 106 side) is referred to as "other end".

The ABS sensor 104a formed by molding a resin so as to cover an end portion of the first electric wires 2 is attached to one end of the pair of first electric wires 2 (the first twisted-pair wire 3), and a vehicle body-side ABS connector 13 for connection to the wire group 107 inside the junction box 106 is attached to the other end of the pair of first electric wires 2 (the first twisted-pair wire 3).

An air pressure sensor connector 14a for connection to the air pressure sensor 108 is attached to one end of the pair of second electric wires 4 (the second twisted-pair wire 5), and a vehicle body-side air pressure sensor connector 14b for connection to the wire group 107 inside the junction box 106 is attached to the other end of the pair of second electric wires 4 (the second twisted-pair wire 5).

A wheel-side power connector 12a for connection to the EPB motor 101a is attached to one end of the pair of third electric wires 6, and a vehicle body-side power connector 12b for connection to the wire group 107 inside the junction box 106 is attached to the other end of the pair of third electric wires 6.

Although the separate connectors are provided on the first electric wires 2 (the first twisted-pair wire 3), the second electric wires 4 (the second twisted-pair wire 5) and the third electric wires 6 in this example, one dedicated connector may be provided such that the electric wires 2, 4 and 6 are connected all together.

Functions and Effects of the Embodiment

As described above, the composite cable 1 in the present embodiment is provided with the tape member 8 spirally wound around the assembled article 7, and is configured such that the two twisted-pair wires 3 and 5 have the same twist direction, the twist direction of the two twisted-pair wires 3 and 5 is different from the twist direction of the assembled article 7, and the twist direction of the assembled article 7 is different from the winding direction of the tape member 8.

Providing the tape member 8 can reduce friction between the electric wires 2, 4, 6 and the sheath 9 without using a lubricant such as talc powder, and thus reduces stress applied to the electric wires 2, 4 and 6 when being bent, and it is thereby possible to improve flex resistance. That is, in the present embodiment, it is possible to prevent deterioration of working environment during cable termination the cable while maintaining flex resistance.

In addition, by differing the twist direction of the twisted-pair wires 3 and 5 from the twist direction of the assembled article 7 and also differing the twist direction of the assembled article 7 from the winding direction of the tape member 8, the kink due to the twisting or the winding of the tape member 8 can be reduced and it is also possible to stabilize the twist pitches P1 to P3 of the twisted-pair wires 3 and 5 and the assembled article 7. As a result, it is possible to reduce variation in bending properties, and also, flexibility in the longitudinal direction is stabilized and it is thereby possible to realize the composite cable 1 which is easy to route. Furthermore, since it is possible to form the composite cable 1 having a cross sectional shape closer to a circle, it is easy to strip the sheath 9.

Summary of the Embodiments

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A composite cable (1), comprising: a first twisted-pair wire (3) formed by twisting a pair of first electric wires (2), each first electric wire (2) comprising a first center conductor (21) and a first insulation (22) covering the first center conductor (21); a second twisted-pair wire (5) formed by twisting a pair of second electric wires (4), each second electric wire (4) comprising a second center conductor (41) and a second insulation (42) covering the second center conductor (41); a pair of third electric wires (3) arranged between the first twisted-pair wire (3) and the second twisted-pair wire (5) in a circumferential direction, each third electric wire (3) having a larger outer diameter than the first electric wire (2) and the second twisted-pair wire (4) and comprising a third center conductor (61) with a larger cross-sectional area than the first center conductor (21) and the second center conductor (41) and a third insulation (62) covering the third center conductor (61); and a tape member (8) spirally wound around an assembled article (7) that is formed by twisting the first twisted-pair wire (3), the second twisted-pair wire (5) and the pair of third electric wires (6) together, wherein the two twisted-pair wires (3, 5) have the same twist direction, the twist direction of the two twisted-pair wires (3, 5) is different from a twist direction of the assembled article (7), and the twist direction of the assembled article (7) is different from a winding direction of the tape member (8).

[2] The composite cable (1) defined by [1], wherein a twist pitch of the two twisted-pair wires (3, 5) is smaller than a twist pitch of the assembled article (7), and a winding pitch of the tape member (8) is smaller than the twist pitch of the assembled article (7) and is not less than the twist pitches of the two twisted-pair wires (3, 5).

[3] The composite cable (1) defined by [1] or [2], wherein the tape member (8) is configured such that a surface in contact with the assembled article (7) comprises a nonwoven fabric, a paper or a resin layer.

[4] The composite cable (1) defined by any one of [1] to [3], wherein the third electric wire (6) comprises a power line for supplying a drive current to a motor (101a) for an electric parking brake (101) mounted on a wheel (102) of a vehicle (100).

[5] The composite cable (1) defined by any one of [1] to [4], wherein at least one of the two twisted-pair wires (3, 5) comprises a signal line for a sensor mounted on a wheel (102) of a vehicle (100).

[6] The composite cable (1) defined by any one of [1] to [5], wherein the assembled article (7) comprises a plurality of thread-shaped fillers (10) arranged between the first twisted-pair wire (3)/the second twisted-pair wire (5)/the pair of third electric wires (6) and the tape member (8), the plurality of fillers (10) are twisted together with the first twisted-pair wire (3), the second twisted-pair wire (4) and the pair of third electric wires (6), and a twist direction of the plurality of fillers (10) is the same as the twist direction of the assembled article (7) and is different from the winding direction of the tape member (8).

[7] A composite harness (11), comprising: the composite cable (1) defined by any one of [1] to [6]; and a connector attached to at least one of end portions of the first electric wires (2), of the second electric wires (3) and of the third electric wires (6).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof.

What is claimed is:

1. A composite cable, comprising:
   a first twisted-pair wire formed by twisting a pair of first electric wires, each first electric wire comprising a first center conductor and a first insulation covering the first center conductor;
   a second twisted-pair wire formed by twisting a pair of second electric wires, each second electric wire comprising a second center conductor and a second insulation covering the second center conductor;
   a pair of third electric wires, each third electric wire having a larger outer diameter than the first and second electric wires and comprising a third center conductor with a larger cross-sectional area than the first and second center conductors and a third insulation covering the third center conductor; and
   a tape member spirally wound around an assembled article that is formed by twisting the first twisted-pair wire, the second twisted-pair wire and the pair of third electric wires together and being in contact with the first twisted-pair wire, the second twisted-pair wire and the pair of third electric wires,
   wherein the first twisted pair wire and the second twisted pair wire are arranged to be opposite to each other with respect to a straight line connecting between centers of the pair of third electric wires,
   wherein the two twisted-pair wires have the same twist direction, the twist direction of the two twisted-pair wires is different from a twist direction of the assembled article, and the twist direction of the assembled article is different from a winding direction of the tape member.

2. The composite cable according to claim 1, wherein a portion of the first twisted pair and a portion of the second twisted pair are located between the pair of third electric wires.

3. The composite cable according to claim 2, wherein a thickness of the first insulation and a thickness of the second insulation are thinner than a thickness of the third insulation.

4. The composite cable according to claim 2, wherein a twist pitch of the two twisted-pair wires is smaller than a twist pitch of the assembled article, and a winding pitch of the tape member is smaller than the twist pitch of the assembled article and is not less than the twist pitches of the two twisted-pair wires.

5. The composite cable according to claim 1, wherein a thickness of the first insulation and a thickness of the second insulation are thinner than a thickness of the third insulation.

6. The composite cable according to claim 5, wherein a twist pitch of the two twisted-pair wires is smaller than a twist pitch of the assembled article, and a winding pitch of the tape member is smaller than the twist pitch of the assembled article and is not less than the twist pitches of the two twisted-pair wires.

7. The composite cable according to claim 1, wherein an outer diameter of the assembled article is 5 mm to 9 mm.

8. The composite cable according to claim 7, wherein a width of the tape member is 20 mm to 50 mm.

9. The composite cable according to claim 8, wherein a twist pitch of the two twisted-pair wires is smaller than a twist pitch of the assembled article, and a winding pitch of the tape member is smaller than the twist pitch of the assembled article and is not less than the twist pitches of the two twisted-pair wires.

10. The composite cable according to claim 8, wherein the tape member is spirally wound around the assembled article so as to overlap at a portion in a width direction and an overlap width of the tape member is not less than ¼ and not more than ½ of a width of the tape member.

11. The composite cable according to claim 1, wherein a twist pitch of the two twisted-pair wires is smaller than a twist pitch of the assembled article, and a winding pitch of the tape member is smaller than the twist pitch of the assembled article and is not less than the twist pitches of the two twisted-pair wires.

* * * * *